United States Patent
Le Pendu et al.

(10) Patent No.: US 9,948,956 B2
(45) Date of Patent: Apr. 17, 2018

(54) METHOD FOR ENCODING AND DECODING IMAGE BLOCK, ENCODER AND DECODER

(71) Applicant: THOMSON LICENSING, Issy de Moulineaux (FR)

(72) Inventors: Mikael Le Pendu, Rennes (FR); Dominique Thoreau, Cesson Sevigne (FR); Christine Guillemot, Chantepie (FR); Martin Alain, Rennes (FR)

(73) Assignee: THOMSON LICENSING, Issy les Moulineaux (FR)

( * ) Notice: Subject to any disclaimer, the term of this patent is extended or adjusted under 35 U.S.C. 154(b) by 155 days.

(21) Appl. No.: 14/739,081

(22) Filed: Jun. 15, 2015

(65) Prior Publication Data

US 2015/0365701 A1    Dec. 17, 2015

(30) Foreign Application Priority Data

Jun. 16, 2014   (EP) .................... 14305920

(51) Int. Cl.
*H04N 19/625* (2014.01)
*H04N 19/42* (2014.01)
(Continued)

(52) U.S. Cl.
CPC ......... *H04N 19/625* (2014.11); *H04N 19/126* (2014.11); *H04N 19/136* (2014.11);
(Continued)

(58) Field of Classification Search
CPC .. H04N 19/593; H04N 19/463; H04N 19/126; H04N 19/136; H04N 19/176;
(Continued)

(56) References Cited

U.S. PATENT DOCUMENTS

| 8,085,852 B2 | 12/2011 | Liu et al. |
| 8,208,560 B2 | 6/2012 | Chiu et al. |

(Continued)

FOREIGN PATENT DOCUMENTS

WO   WO2012008130   1/2012

OTHER PUBLICATIONS

Search Report dated Dec. 4, 2014.
(Continued)

*Primary Examiner* — Neil Mikeska
(74) *Attorney, Agent, or Firm* — Tutunjian & Bitetto, P.C.

(57) ABSTRACT

A method for encoding and decoding an image block, an encoder, and a decoder are provided. The method for encoding an image block comprises: determining a local dynamic range of the block; adaptively precision-extending pixel values of the block based on the local dynamic range of the block; and encoding the block with an adaptively extended precision. The method for decoding an image block comprises: determining a minimum pixel value of the block and an indicating value for indicating a precision extension factor according to precision extension information; decoding the block according to the indicating value; and de-extending precision of the decoded block based on the minimum pixel value of the block and the precision extension factor. The precision of the intermediate calculations may be improved without increasing an original intermediate bit depth used in intermediate calculations.

17 Claims, 4 Drawing Sheets

(51) Int. Cl.
*H04N 19/44* (2014.01)
*H04N 19/176* (2014.01)
*H04N 19/593* (2014.01)
*H04N 19/463* (2014.01)
*H04N 19/126* (2014.01)
*H04N 19/136* (2014.01)
*H04N 19/98* (2014.01)

(52) U.S. Cl.
CPC ........... *H04N 19/176* (2014.11); *H04N 19/42* (2014.11); *H04N 19/45* (2014.11); *H04N 19/463* (2014.11); *H04N 19/593* (2014.11); *H04N 19/98* (2014.11)

(58) Field of Classification Search
CPC ...... H04N 19/625; H04N 19/45; H04N 19/42; H04N 19/98
See application file for complete search history.

(56) References Cited

U.S. PATENT DOCUMENTS

| | | | |
|---|---|---|---|
| 8,559,734 B2* | 10/2013 | Ohnishi | H04N 19/61 382/232 |
| 8,606,028 B2 | 12/2013 | Noda et al. | |
| 2002/0181793 A1* | 12/2002 | Kondo | H04N 19/50 382/240 |
| 2008/0291295 A1* | 11/2008 | Kato | H04N 19/124 348/231.99 |
| 2009/0087111 A1* | 4/2009 | Noda | H04N 21/23892 382/238 |
| 2011/0243232 A1* | 10/2011 | Alshina | H04N 19/61 375/240.16 |
| 2011/0280302 A1 | 11/2011 | Alshina et al. | |
| 2013/0101037 A1 | 4/2013 | Chono et al. | |

OTHER PUBLICATIONS

International Standard ISO/IEC 14496-10, "Information technology—Coding of audio-visual objects—Part 10: Advanced Video Coding", Oct. 1, 2004, pp. 1-280.

Rosewarne et al., "JCT-VC AHG report: HEVC range extensions development (AHG5)", 16th Meeting, San Jose, California, US, Jan. 9, 2014, pp. 1-4.

Bross et al., "High Efficiency Video Coding (HEVC) text specification draft 9", Joint Collaborative Team on Video Coding, 11th Meeting, Shanghai, China, Oct. 10, 2012, pp. 1-316.

* cited by examiner

METHOD FOR ENCODING AND DECODING IMAGE BLOCK, ENCODER AND DECODER

This application claims the benefit, under 35 U.S.C. § 119 of European Patent Application No. 14305920.2, filed Jun. 16, 2014.

TECHNICAL FIELD

The present disclosure relates to a method for encoding and decoding an image block, an encoder, and a decoder.

BACKGROUND

Traditional tools for compression of image sequences are designed to encode integer data with limited dynamic range. The MPEG-4 (Moving Picture Expert Group) AVC (Advanced Video Coding)/H.264 norm (described in ISO/IEC 14496-10) and the HEVC (High Efficiency Video Coding) norm (described in B. Bross etc. JCTVC-K1003, "High Efficiency Video Coding (HEVC) text specification draft 9" October 2012) define examples of such tools.

Generally, under the AVC and HEVC norms, pixel data of a single pixel in an image comprises three components: one luminance component Y and two chrominance components U and V. Compression standards such as AVC and HEVC are used to compress images and videos whose pixel's each component is initially encoded with 8 bit depth. In extended versions of these standards, greater bit depths can be taken as input. For example, in the Range Extension version of HEVC, up to 16 bit input data is supported. The bit depth normally refers to number of bits used to indicate each component of a single pixel in an image.

Those standards are based on the discrete cosine transform (DCT). Theoretically, the coefficients obtained by performing a DCT transform on a block of an image are not necessarily integers, even though the input pixel data is an integer. In practice, however, the DCT is used for lossy compression, which means that a quantization is performed on the DCT coefficients. In this type of lossy coding scheme, it is generally preferred to use integers directly in the calculation of the DCT transform in order to reduce computation costs both at the encoder and at the decoder.

In this case, it is necessary to extend the DCT coefficients to keep sufficient precision in the calculation of DCT transform. For example, in HEVC, while input images are defined on integers with 8 or 10 bit depth, the calculation of DCT transform is performed on 32 bit depth. In the Range Extension version, up-to-16 bit depth of the input data can be supported, and the calculation of DCT transform is performed on greater bit depths, for example, 64 bit depth.

SUMMARY

In embodiments of the present disclosure, there are provided a method for encoding and decoding an image block, an encoder, and a decoder which seek for improving the computation precision while keeping original bit depth of an image block.

According to one aspect of the embodiments of the present disclosure, there is provided a method for encoding an image block comprising: determining a local dynamic range of the block; adaptively precision-extending pixel values of the block based on the local dynamic range of the block; and encoding the block with an adaptively extended precision.

According to another aspect of the embodiments of the present disclosure, there is provided a method for decoding an image block comprising: determining a minimum pixel value of the block and an indicating value for indicating a precision extension factor according to precision extension information; decoding the block with an adaptively extended precision according to the indicating value; and de-extending precision of the decoded block based on the minimum pixel value of the block and the precision extension factor.

According to another aspect of the embodiments of the present disclosure, there is provided a computer program product downloadable from a communication network and/or recorded on a medium readable by computer and/or executable by a processor, comprising program code instructions for implementing the steps of above encoding method and/or decoding method.

According to another aspect of the embodiments of the present disclosure, there is provided a non-transitory computer-readable medium comprising a computer program product recorded thereon and capable of being run by a processor, including program code instructions for implementing the steps of above encoding method and/or decoding method.

According to still another aspect of the embodiments of the present disclosure, there is provided an encoder comprising: a local dynamic determination module used to determine a local dynamic range of the block; an adaptive precision extension module used to adaptively precision-extend pixel values of the block based on the local dynamic range of the block; and an encoding module used to encode the block with an adaptively extended precision.

According to a variant of the embodiment, the local dynamic range of the block comprises a maximum pixel value and a minimum pixel value, and said local dynamic determination module is used to determine the maximum pixel value and the minimum pixel value among the pixel values of the block.

According to another variant of the embodiment, said adaptive precision extension module comprises a factor determination submodule and an extension submodule; wherein said factor determination submodule is used to calculate a precision extension factor based on a difference between the maximum pixel value and the minimum pixel value while keeping an original bit depth of the pixel values of the block; and said extension submodule is used to, for each of the pixels in the block and other blocks from which the block is predicted, calculate a new pixel value by subtracting the minimal pixel value from the pixel value of the pixel, and precision-extend the new pixel value by the precision extension factor.

According to another variant of the embodiment, said encoding module comprises a prediction submodule, a DCT transform submodule, and a quantization submodule, wherein the prediction submodule is used to predict the block by using said other blocks after being adaptively precision-extended by said extension module; the DCT transform submodule is used to calculate residual values between the block and the predicted block and perform a DCT transform on the residual values to obtain coefficients of the block; and the quantization submodule is used to calculate a quantization step based on the difference and the original bit depth, and quantize the coefficients of the block according to quantization step.

According to another variant of the embodiment, the encoding module is further used to encode the minimum pixel value and an indicating value for indicating the precision extension factor as precision extension information, wherein the indicating value comprises at least one of the difference between the maximum pixel value and the minimum pixel value, a reduced bit depth used for indicating the difference, and a difference between the original bit depth and the reduced bit depth.

According to yet another aspect of the embodiments of the present disclosure, there is provided a decoder comprising: a block information determination module used to determine a minimum pixel value of the block and an indicating value for indicating a precision extension factor according to received precision extension information; a decoding module used to decode the block with an adaptively extended precision according to the indicating value; and an adaptive precision restoring module used to de-extend precision of the decoded block based on the minimum pixel value of the block and the precision extension factor.

According to a variant of the embodiment, said decoding module comprises: an inverse-quantization submodule and an inverse DCT transform submodule; the inverse-quantization submodule is used to calculate a quantization step based on the indicating value and inverse-quantize encoded data of the block according to quantization step; and the inverse DCT transform submodule is used to calculate residual values by performing inverse-DCT transform on the inverse-quantized encoded data of the block.

According to another variant of the embodiment, said decoding module further comprises: an adaptive precision extension submodule, a predication submodule and a reconstruction submodule; the adaptive precision extension submodule is used to, for other decoded blocks from which the block is predicted, adaptively precision-extending pixel values of said other decoded blocks based on the minimum pixel value of the block and the precision extension factor while keeping the original bit depth of the block; the predication submodule is used to predict the block by using the other decoded blocks being precision-extended; and the reconstruction submodule is used to reconstructing the block to be decoded by adding the predicted block and the residual values to obtain the decoded block.

According to another variant of the embodiment, said adaptive precision restoring module determines the precision extension factor by calculating a proportion between a maximum integer which can be indicated by an original bit depth of the block and the difference between the maximum pixel value and the minimum pixel value when the indicating value comprises the difference, or by calculating a bit depth-extension-quantity power of 2 when the indicating value comprises the reduced bit depth or the bit depth difference, wherein the bit depth-extension-quantity is the bit depth difference.

According to another variant of the embodiment, said adaptive precision restoring module is used to divide each of pixel values of the decoded block by the precision extension factor, and then add the minimum pixel value thereto; and the adaptive precision extension submodule is used to, for each of the pixel values in the other decoded blocks from which the block is predicted, calculate a new pixel value by subtracting the minimal pixel value from the pixel value, and multiply the new pixel value by the precision extension factor.

According to the embodiments of the present disclosure, the pixel value is a luminance value or a chrominance value.

According to the embodiments of the present disclosure, a local dynamic range is determined for an image block, a pixel value within such local dynamic range is firstly indicated by a reduced bit depth less than an original bit depth of the image block and is then precision-extended to such original bit depth, such that the precision of the subsequent calculations such as DCT transform may be improved while the original bit depth of the image block and an original intermediate bit depth used in intermediate calculations such as the DCT transform keeps unchanged.

BRIEF DESCRIPTION OF THE DRAWINGS

In order to more clearly describe the technical solutions of the embodiments of the present disclosure or the prior art, drawings necessary for describing the embodiments of the present disclosure or the prior art are simply introduced as follows. It should be obvious for those skilled in the art that the drawings described as follows only illustrate some embodiments of the present disclosure and other drawings can be obtained according to these drawings without paying any inventive efforts.

DETAILED DESCRIPTION OF THE PREFERRED EMBODIMENTS

To illustrate the technical solutions of embodiments of the present disclosure clearly and fully, hereinafter, detailed descriptions will be made to the embodiments of the present disclosure in connection with the appended drawings. Obviously, the embodiments as described are only a part of the embodiments of the present disclosure, and are not all the embodiments of the present disclosure. All the other embodiments which are obtained by those skilled in the art based on the embodiments of the present disclosure without paying any inventive labor fall into the protection of the present disclosure.

Under the AVC and HEVC standards, pixel data for each pixel of an image can be indicated by three components including a luminance component Y and two chrominance components U and V, and each component is indicated by the same number of bits. In this circumstance, for an image, the luminance component of each of pixels from the darkest one to the brightest one is indicated by the same number of bits, for example, the luminance component of each pixel in the image is indicated by 8 bits (8 bit depth) or by 12 bits (12 bit depth). As above mentioned, in the encoding process as well as the decoding process, the number of bits used for intermediate calculation is more than the number of bits used for indicating each component of a pixel (i.e. bit depth), which leads to long calculation and complexity in hardware or software implementation. It should be known that the encoding and decoding process for the luminance component and that for the chrominance component are almost the same. In this case, in order to simplify the description, the encoding and decoding process of the luminance component is described as an example, and the same encoding and decoding processes can be similarly applied to the chrominance components. Hereinafter, a term "pixel value" can be "luminance value" or "chrominance value".

According to the embodiments of the present disclosure, a local dynamic range of a block is proposed. For a block of an image to be encoded, in view of the luminance component, a dynamic range is defined by the luminance value (that is, pixel value) of the brightest pixel and the luminance value of the darkest pixel. Similarly, a dynamic range of the image (or a video including the image) can be determined by the luminance value of the brightest pixel and the luminance value of the darkest pixel in the image (or the video). Generally, the dynamic range of a block in an image (hereinafter referred to as the local dynamic range) is narrower than the dynamic range of the image or the video (hereinafter referred to as the global dynamic range).

Figure 1:
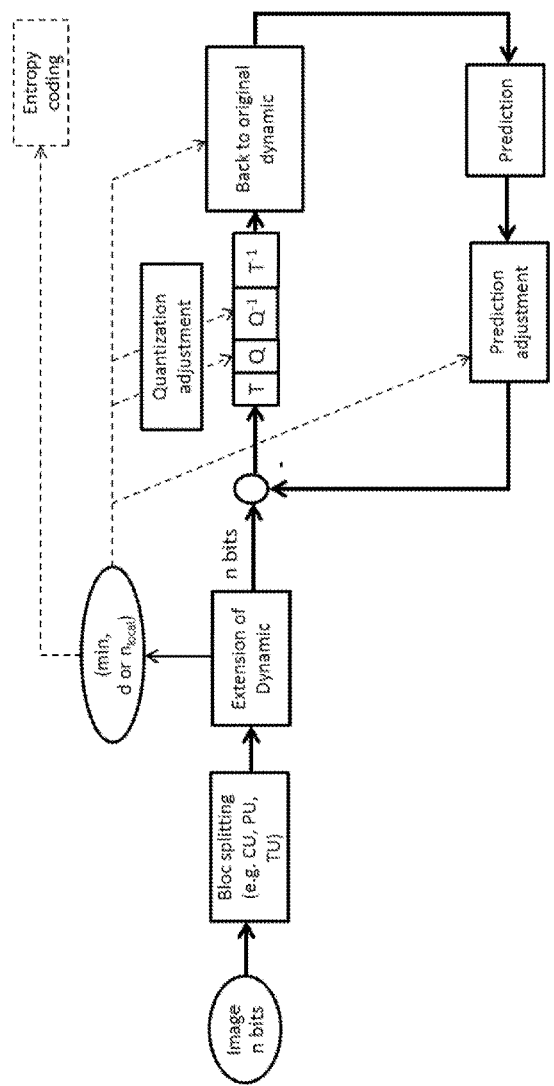
FIG. 1 is a compression scheme with extension of the local dynamic according to the embodiments of the present disclosure.

FIG. 1 is a compression scheme with precision extension according to the embodiments of the present disclosure.

It is supposed that n-bit input data is supported and classical coding scheme such as H.264 or HEVC is adopted. In these coding schemes, an input image is split or divided into blocks. For example, in HEVC, there are several splittings: CU (coding unit), PU (prediction unit), and TU (transform unit). These different splittings can be used to define the local dynamic range of a block. In the following description, the above mentioned different splittings are not particularly distinguished, but is referred to as splitting in general. Accordingly, the CU, the PU and the TU are not particularly distinguished, but are referred to as a block in general.

Figure 2:
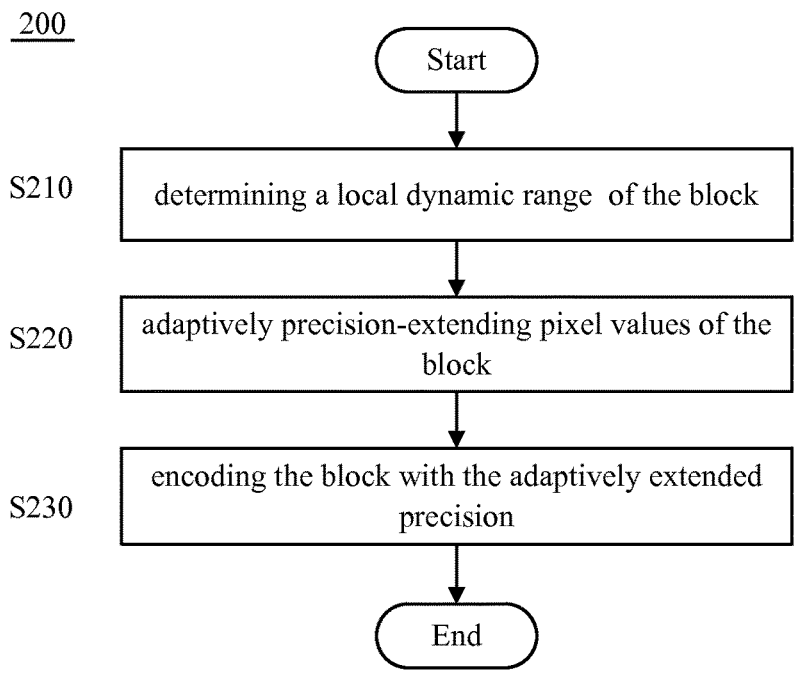
FIG. 2 is a schematic flowchart of a method for encoding a block in an image according to the embodiments of the present disclosure.

FIG. 2 is a schematic flowchart of the method for encoding a block in an image according to the embodiments of the present disclosure.

At step S210, a local dynamic range of the block is determined.

As described above, the local dynamic range of pixel values (for example, luminance values) in the block can be defined by the luminance value of the brightest pixel and the luminance value of the darkest pixel in the block. In this case, the luminance value of the brightest pixel is also referred to as a maximum pixel value max, and the luminance value of the darkest pixel is also referred to as a minimum pixel value min.

At step S220, adaptive precision extension is performed on the pixel values in the block based on the determined local dynamic range of the block.

In one example, for each pixel in the block, a new pixel value is calculated by subtracting the minimum pixel value min from the pixel value of the pixel. In the block, the new pixel values of all pixels are within the range of [0, max−min].

In the case that the number of bits used for the intermediate calculation keeps unchanged, precision extension can be made to the new pixel values in the block adaptively according to the local dynamic range of the new pixel values in the block and the number of bits n used for indicating the input pixel values.

For example, the precision extension can be made by multiplying each of the new pixel values in the block with a precision extension factor f which is calculated according to the local dynamic range of the new pixel values in the block and the number of bits n used for indicating the input luminance values.

In this case, given a pixel having an input pixel value x being an integer in a block with the minimum pixel value min and the maximum pixel value max, the precision-extended new pixel value x' for the pixel can be expressed by the following equation (1):

$$x' = [(x - \min) \cdot f] = \left[(x - \min) \cdot \frac{2^n - 1}{d}\right] \quad (1)$$

where d=max−min.

It can be seen from the above equation (1) that the precision extension factor f can be calculated based on a difference d between the maximum pixel value and the minimum pixel value of the block while an original bit depth n of the pixel values of the block keeps unchanged (i.e. using n bits to represent the x'), and particularly can be represented by $$f = \frac{2^n - 1}{d},$$

where $2^n-1$ represents a maximum integer which can be indicated by the original bit depth n. As a result, the narrower the local dynamic range of the block is, the greater it can be extended without increasing the number of bits used for indicating (or representing) the precision-extended new pixel values in the block (that is, bit depth).

It should be known that the above precision extension factor may be a decimal, and in turn the precision-extended new pixel value x' may also be a decimal. Since the precision-extended new pixel value x' is now indicated by n bits, the precision-extended new pixel value calculated thus should be rounded, ceiled or floored to an integer.

By the way, based on the largest new pixel value max−min, the number of bits $n_{local}$ necessary for indicating the new pixel values after subtraction but without precision extension can be determined by the following equation (2):

$$n_{local} = \lceil \log_2(\max-\min+1) \rceil \quad (2)$$

where $\lceil \cdot \rceil$ is the ceiling operation. It should be noted that the number of bits $n_{local}$ is the minimum number of bits that can represent the new pixel values after subtraction but without precision extension.

From the above equation (2), it can be seen that only $n_{local}$ bits (hereinafter referred to as reduced bit depth) are necessary for indicating the new pixel values after subtraction but without precision extension. As previously discussed, the input luminance value for each pixel is indicated by n bits. Typically, $n_{local} \leq n$.

In another example, the precision extension can be made to the new pixel values after subtraction but without precision extension in the block adaptively according to the reduced bit depth $n_{local}$ used for indicating the new pixel values and the original bit depth n.

In this case, still given a pixel having an input pixel value x being an integer, when $2^{n_{local}} > \max-\min$, the precision-extended new pixel value x' for the pixel can be expressed by the following equation (3):

$$x' = [(x-\min) \cdot f] = [(x-\min) \cdot 2^{n-n_{local}}] = (x-\min) << (n-n_{local}) \quad (3)$$

where $f=2^{n-n_{local}}$, << is a left shift operator, and $<<(n-n_{local})$ is equivalent to a multiplication by a $(n-n_{local})$ power of 2. That is, the precision extension factor is a $(n-n_{local})$ power of 2.

After obtaining the precision-extended new pixel value for each of the pixels in the block, the method for encoding the block according to the embodiments of the present disclosure proceeds to step S230.

At step S230, the block is encoded with an adaptively extended precision. Particularly, the precision-extended new pixel value of each pixel in the block is encoded.

Figure 3:
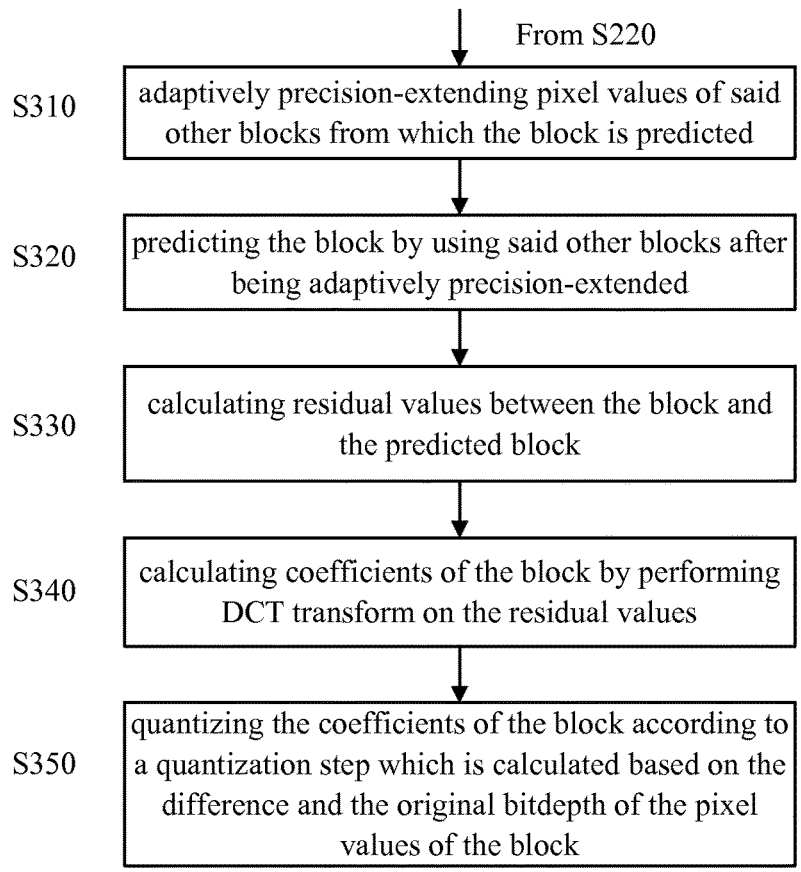
FIG. 3 is a schematic flowchart of step S230 according to the embodiments of the present disclosure.

In addition, the minimum pixel value min and an indicating value for indicating the precision extension factor are encoded as precision extension information. The indicating value comprises at least one of the difference d between the maximum pixel value max and the minimum pixel value min, the reduced bit depth $n_{local}$, and a difference $(n-n_{local})$ between the original bit depth n and the reduced bit depth FIG. 3 is a schematic flowchart of the step S230 according to the embodiments of the present disclosure.

In the above mentioned classical compression scheme such as AVC or HEVC, the encoding process is mainly based on spatio-temporal predictions, transform and quantization.

Since the precision extension has been performed adaptively according to the local dynamic range of the block in the above step S220, the coherence between the block and other blocks (hereinafter referred to as referred blocks) which are used to predict the block is lost. If no adjustment was made, this would results in poor spatial and temporal predictions.

At step S310, for each of the pixel values of the referred blocks, adaptive precision extension is performed on the pixel value based on the determined local dynamic range of the block. Particularly, the same precision extension as that performed in S220 is also applied to the pixel values of the pixels in the referred blocks.

For example, given a pixel value $x_{pred}$ of a pixel which is used to predict the pixel value of a pixel in the block, it is possible that $x_{pred}<min$ or $x_{pred}>max$. In this case, the pixel value $X'_{pred}$ resulting from the precision extension may not be in the interval $[0, 2^n-1]$, and the precision-extended pixel value $x'_{pred}$ should be truncated to keep in the interval $[0, 2^n-1]$ if it is out of the interval $[0, 2^n-1]$. Alternatively, the pixel value $x_{pred}$ should be set to min if is less than min and to max if it is greater than max.

Then, at step S320, the precision-extended pixel values of the pixels in the block are predicted by using said referred blocks after being adaptively precision-extended. That is, the precision-extended pixel values of the pixels in the block are predicted by using the precision-extended pixel values of the pixels in the referred blocks. Here, the prediction may be done in a classical scheme such as the prediction scheme in AVC or HEVC.

After the pixels in the block to be encoded are predicted by the referred blocks, at step S330, for each pixel in the block, the difference between the precision-extended pixel value of the pixel and the predicted pixel value is calculated and referred to as the residual value of the pixel.

At step S340, a DCT transform is performed on the residual values so as to obtain coefficients of the block.

At step S350, the coefficients obtained from the DCT transform are quantized, such that the lossy compression is performed on the coefficients.

It should be clear that the residual value of the pixel thus obtained is also precision-extended. Once the DCT transform is applied to the residual values of the pixels in the block, the coefficients obtained from the DCT transform are also precision-extended. Therefore, in the step S350, the precision extension should be removed.

For example, the coefficients obtained from the DCT transform are firstly divided by the precision extension factor used for the precision extension during the quantization process, which is equivalent to applying a stronger quantization. Without this adjustment, the blocks with high dynamic (and thus a low factor) would be quantized more coarsely than the blocks with low dynamic (and thus a high factor).

After such extension removing process, for a coefficient c' obtained from the DCT transform of a block after extension, we get the de-extended coefficient c'/f, where $$f = \frac{2^n - 1}{d}$$

or $f=2^{n-n_{local}}$. Then, quantization is applied to the de-extended coefficient.

It is assumed that an original quantization step in classical coding schemes is Qstep. So, the coefficient c' obtained from the DCT transform would have the following quantized coefficient:

$$c_{quant} = \left[\frac{c'/f}{QStep}\right] \quad (4)$$

According to the above equation (4), an equivalent quantization step used for quantizing the coefficient c' can be represented by f·Qstep.

In one example, in classical coding schemes, the quantization step Qstep is not directly given by the user. In HEVC, for example, an integer valued quantization parameter (QP) is used instead, for example the QP is within a range of [0, N]. The quantization step Qstep is computed from the QP, and the value of the quantization step Qstep increases with the increase of the value of QP.

Particularly, for example, the value of the quantization step Qstep is doubled if the value of QP increases by 6. In other words, incrementing the value of the QP is equivalent to multiplying the quantization step Qstep by $$\sqrt[6]{2},$$

and thus an increment of 6 to the value of the QP corresponds to a multiplication of the quantization step by 2. The quantization step Qstep can be calculated by the following equation (4):

$$Qstep=2^{QP/6} \cdot Qstep(0) \quad (4)$$

where Qstep(0) represents the value of Qstep when the value of QP is 0. The greater the Qp and Qstep are, the more coarse the quantization is.

In the case of an implementation of the factor of equation (3) in HEVC, $f=2^{n-n_{local}}$. In such cases, the equivalent quantization step f·Qstep can be calculated by the following equation (6):

$$f \cdot Qstep = f \cdot 2^{QP/6} \cdot Qstep(0) = 2^{(QP/6+(n-nlocal))} \cdot Qstep(0) = 2^{(QP+6(n-nlocal))/6} \cdot Qstep(0) \quad (6)$$

$$QP' = QP + 6(n-n_{local}) \quad (7)$$

From the above equation (7), the equivalent QP' for the above coefficient c' obtained from the DCT transform is obtained. That is, the equivalent QP' is obtained by adding a value of $6(n-n_{local})$ to the original QP for the original coefficient which is not precision-extended as in the classical compression scheme such as AVC or HEVC. Here, the calculation of the original QP is not described, in order not to obstruct the embodiments of the present disclosure.

Commonly, the value of Qstep and the value of QP are pre-stored in the encoder and decoder. In such circumstance, when we get the equivalent QP', the equivalent quantization step f·Qstep corresponding to the equivalent QP' can be obtained according to the relationship between the pre-stored values of Qstep and QP.

After the step S230, the encoded data for the block is obtained as well as the encoded precision extension information. Both the encoded data and the precision extension information should be written in a bit stream, such that the decoder can correctly decode the encoded data.

In the case that the minimum pixel value min and the difference d are written, both the minimum pixel value min and the difference d are encoded, particularly each of the minimum pixel value min and the difference d requires n bits.

Furthermore, the number of bits that must be written to the bit stream can be reduced by considering some useful information. For example, since min+d=max<$2^n$, we can get d<$2^n$−min. As a result, if there is an integer $n_d$<n such that $2^n$−min≤$2^{n_d}$, then d<$2^{n_d}$. Assuming that min is encoded before d, the value $n_d$ can be calculated by the decoder and d can be encoded using only $n_d$ bits.

In the case that the minimum pixel value min and the number of bits (n−$n_{local}$) or $n_{local}$ are written, particularly min requires n bits and (n−$n_{local}$) or $n_{local}$ requires $\lceil \log_2 n \rceil$ bits, where $\lceil \cdot \rceil$ is the ceiling operation. In such case, the number of bits that must be written to the bit stream is further reduced.

Another possible improvement consists in performing a prediction for the min of the block to be encoded based on neighboring blocks previously encoded. Only the prediction residual would then need to be encoded. For example, a predictor of the min for the block to be encoded could be the median of the values of the left, the upper left and the upper encoded blocks. Similarly, the same kind of predictor could be used for the value d or $n_{local}$.

Figure 4:
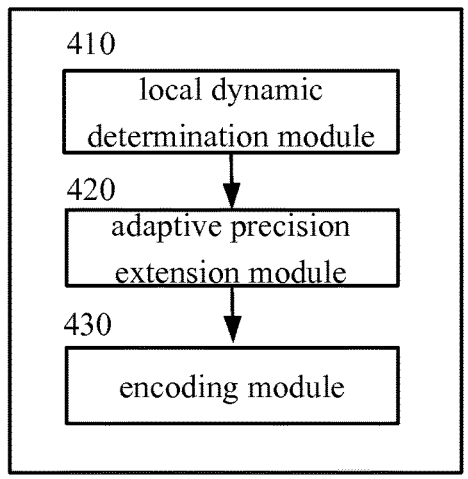
FIG. 4 is a schematic diagram of an encoder according to the embodiments of the present disclosure.

FIG. 4 is a schematic diagram of an encoder according to the embodiments of the present disclosure.

As shown in FIG. 4 the encoder 400 comprises: a local dynamic determination module 410, an adaptive precision extension module 420, and an encoding module 430. Functions of all these modules are performed by CPU of the encoder or a dedicated integrated circuit (IC).

The local dynamic determination module is used to determine a local dynamic range of the block. Particularly, the local dynamic determination module can operate in the manner as described in the above step S210.

The adaptive precision extension module is used to perform adaptive precision extension on the pixel values in the block based on the determined local dynamic range of the luminance values in the block, and comprise a factor determination submodule and an extension submodule.

The factor determination submodule is used to calculate a precision extension factor based on a difference between the maximum pixel value and the minimum pixel value while keeping an original bit depth of the pixel values of the block.

The extension submodule is used to, for each of the pixels in the block and other blocks from which the block is predicted, calculate a new pixel value by subtracting the minimal pixel value from the pixel value of the pixel, and precision-extend the new pixel value by the precision extension factor.

Particularly, in the adaptive precision extension module, the factor determination submodule and the extension submodule can operate in the manner as described in the above step S220 and step S310.

The encoding module is used to encode the block with an adaptively extended precision, and comprises a prediction submodule, a DCT transform submodule, and a quantization submodule.

The prediction submodule is used to predict the block by using said other blocks after being adaptively precision-extended by said extension module.

The DCT transform submodule is used to calculate residual values between the block and the predicted block and perform a DCT transform on the residual values to obtain coefficients of the block.

The quantization submodule is used to calculate a quantization step based on the difference and the original bit depth, and quantize the coefficients of the block according to quantization step. The quantization submodule can operate in the manner as described in the above step S340.

In addition, the encoding module is further used to encode the minimum pixel value and an indicating value for indicating the precision extension factor as precision extension information.

Figure 5:
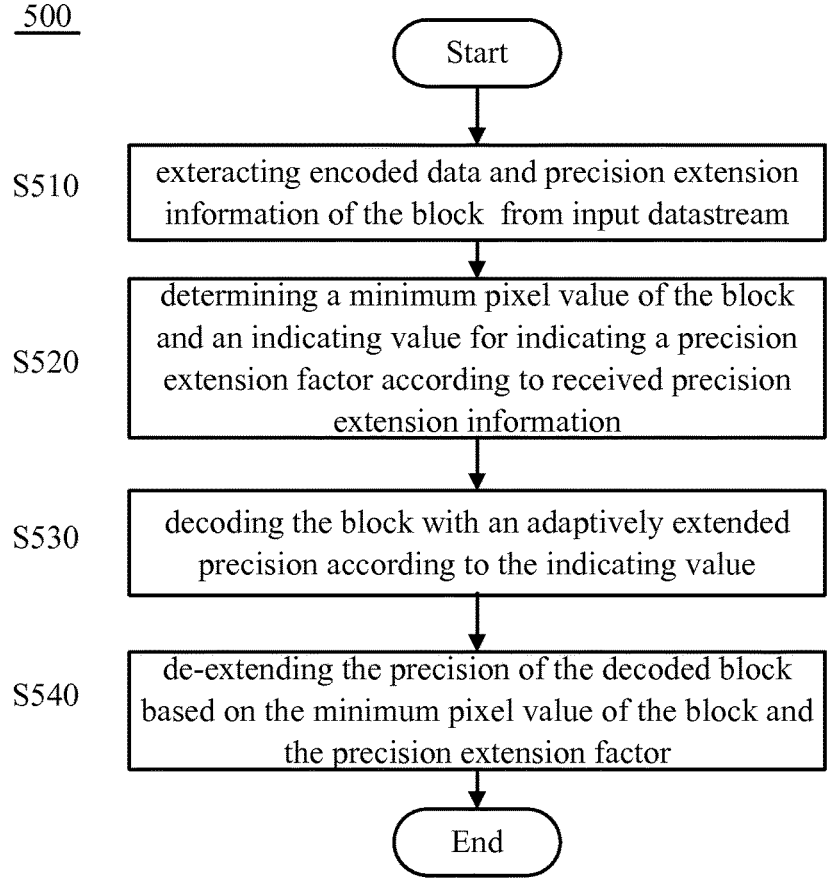
FIG. 5 is a flowchart of a method for decoding a block in an image according to the embodiments of the present disclosure.

FIG. 5 is a flowchart of a method for decoding a block in an image according to the embodiments of the present disclosure.

At step S510, encoded data and precision extension information of the block are extracted from input data stream. As described above, the precision extension information can include the minimum pixel value min of the block and an indicating value for indicating the precision extension factor, the indicating value comprises at least one of the difference d between the maximum pixel value max and the minimum pixel value min, the reduced bit depth $n_{local}$, and a difference (n−$n_{local}$) between the original bit depth n and the reduced bit depth $n_{local}$.

At step S520, the minimum pixel value min of the block and the indicating value for indicating the precision extension factor are determined according to the precision extension information.

In the case that the precision extension information includes the minimum pixel value min and the difference d, assuming that the min is decoded before d by using n bits, the value $n_d$ for indicating d can be calculated by the decoder according to $2^n$−min≤$2^{2_d}$, and then d can be decoded using only $n_d$ bits.

In the case that the additional information includes the minimum pixel value min and the number of bits (n−$n_{local}$) or $n_{local}$, the min is decoded by using n bits and the (n−$n_{local}$) or $n_{local}$ is decoded by using $\lceil \log_2 n \rceil$ bits, where $\lceil \cdot \rceil$ is the ceiling operation.

At step S530, the encoded data of the block is decoded with an adaptively extended precision according to the indicating value.

As described above, thus decoded pixel value for a pixel in the block is still precision-extended. So, a de-extension operation should be made to the decoded pixel value.

At step S540, a precision de-extension operation is performed on the decoded pixel value for each pixel of the block, such that a final de-extended decoded value for each pixel can be obtained.

Particularly, each of pixel values of the decoded block is divided by the precision extension factor, and then the minimum pixel value is added thereto. The precision extension factor may be calculated in the manner as described in the step S220.

Assuming that the decoded pixel value for a pixel at the step S530 is represented by x″, which includes an error with respect to the pixel value x before being encoded caused by lossy coding and decoding.

When the precision extension information includes the minimum pixel value min and the difference d between the minimum pixel value min and the maximum pixel value max, the final de-extended decoded pixel value is represented by the following equation (8):

$$x_{dec} = \left[ x'' \frac{d}{2^n - 1} + \min \right] \quad (8)$$

Alternatively, when the additional information includes the minimum pixel value min and the number of bits $(n-n_{local})$ or $n_{local}$, the final de-extended decoded pixel value is represented by the following equation (9):

$$x_{dec} = \left\lfloor \frac{x''}{2^{(n-nlocal)}} \right\rfloor + \min = (x'' \gg (n - nlocal)) + \min \quad (9)$$

Where $\lfloor \cdot \rfloor$ is a flooring operation, >>(right shift operator) is equivalent to a division by a power of 2, and $>>(n-n_{local})$ is equivalent to a division by a $(n-n_{local})$ power of 2.

Figure 6:
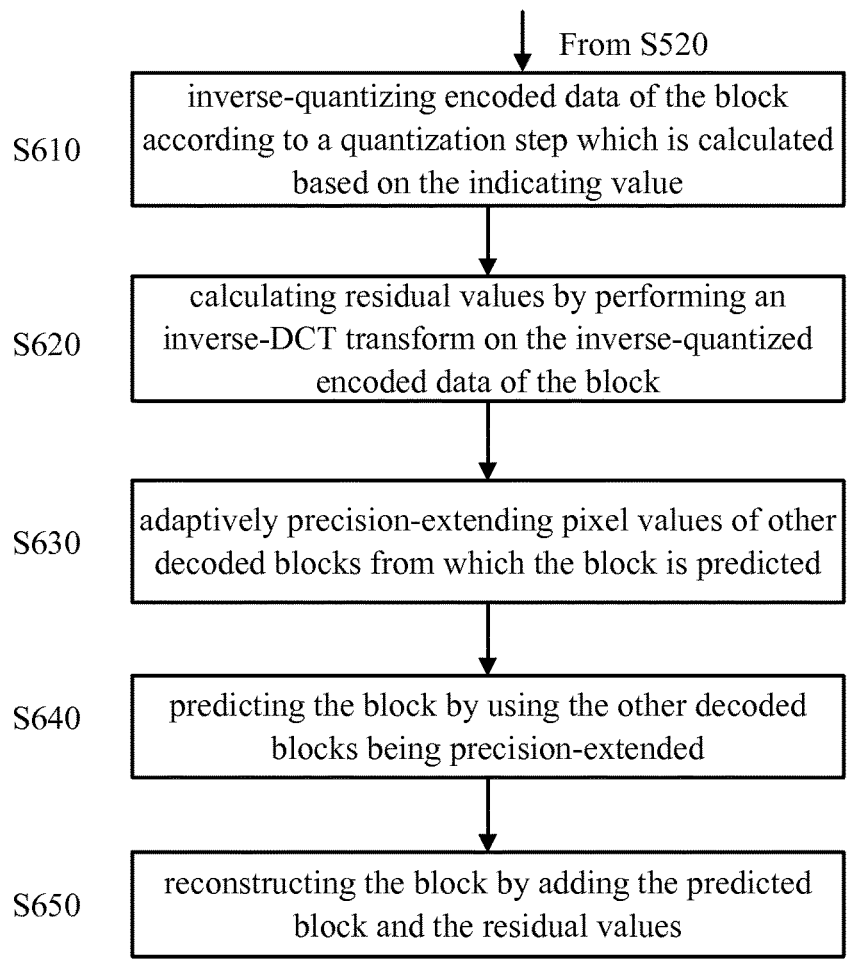
FIG. 6 is a schematic flowchart of step S530 according to the embodiments of the present disclosure.

FIG. 6 is a schematic flowchart of the step S530 according to the embodiments of the present disclosure.

At step S610, quantization step for an inverse quantization is calculated based on the indicating information. As described in the step S340, according to the above equation (6), the quantization step f·Qstep can be calculated. It should be clear that, thus calculated quantization step f·Qstep has considered the precision extension factor f.

At step S620, the encoded data of the block is inverse-quantized based on the quantization step.

After determining the quantization step f·Qstep, an inverse quantization operation is performed on the encoded data (the encoded coefficients) of the block based on the quantization step f·Qstep, such that inverse-quantized coefficients are obtained. Assuming that an inverse-quantized coefficient c″ is obtained, which corresponds to the above mentioned coefficient c′ in the above equation (4) with an error caused by lossy coding and decoding.

Then, at step S630, an inverse DCT transform is performed on the inverse-quantized encoded data (the coefficient c″) of the block, so that the residual values of the block can be obtained. It should be clear that thus obtained residual value is precision-extended.

At step S640, adaptive precision extension is performed on pixel values of other decoded blocks from which the block is predicted. The adaptive precision extension can be performed in the manner as described in the step S220.

At step S650, the block is predicted by using the other decoded blocks being precision-extended.

At step S660, the predicted block and the residual values are added to obtain the decoded block. Then, the decoded block is de-extended in the step S540.

Figure 7:
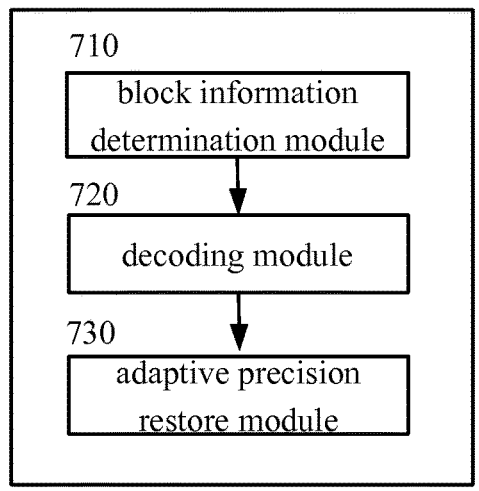
FIG. 7 is a schematic diagram of a decoder according to the embodiments of the present disclosure.

FIG. 7 is a schematic diagram of a decoder according to the embodiments of the present disclosure.

As shown in FIG. 7 the decoder 700 comprises: a block information determination module 710, a decoding module 720 and an adaptive precision restoring module 730.

The block information determination module is used to determine a minimum pixel value of the block and an indicating value for indicating a precision extension factor according to received precision extension information. The block information determination module can operate in the manner as described in the step S520.

The decoding module is used to decode the block with an adaptively extended precision according to the indicating value. The decoding module can operate in the manner as described in the step S530.

The decoding module comprises an inverse-quantization submodule and an inverse DCT transform submodule.

The inverse-quantization submodule is used to calculate a quantization step based on the indicating value and inverse-quantize encoded data of the block according to quantization step, and can operate in the manner as described in the step S610 and S620.

The inverse DCT transform submodule is used to calculate residual values by performing inverse-DCT transform on the inverse-quantized encoded data of the block, and can operate in the manner as described in the step S630.

Furthermore, the decoding module further comprises an adaptive precision extension submodule, a predication submodule and a reconstruction submodule.

The adaptive precision extension submodule is used to, for other decoded blocks from which the block is predicted, adaptively precision-extending pixel values of said other decoded blocks based on the minimum pixel value of the block and the precision extension factor while keeping the original bit depth of the block.

Particularly, the adaptive precision extension submodule is used to, for each of the pixel values in the other decoded blocks from which the block is predicted, calculate a new pixel value by subtracting the minimal pixel value from the pixel value, and multiply the new pixel value with the precision extension factor, and can operate in the manner as described in the step S640 and S220.

The predication submodule is used to predict the block by using the other decoded blocks being precision-extended, and can operate in the manner as described in the step S650.

The reconstruction submodule is used to reconstructing the block to be decoded by adding the predicted block and the residual values to obtain the decoded block, and can operate in the manner as described in the step S660.

The adaptive precision restoring module is used to de-extend the precision of the decoded block based on the minimum pixel value of the block and the precision extension factor.

Particularly, the adaptive precision restoring module is used to divide each of pixel values of the decoded block by the precision extension factor, and then add the minimum pixel value thereto, and can operate in the manner as described in the step S540.

According to the embodiments of the present disclosure, the precision of the intermediate calculations in encoding and decoding process (in the encoder and the decoder) can be increased without increasing the bit depth used for those calculations.

Although the embodiments of the present disclosure have been described based on the high dynamic range compression, the embodiments of the present disclosure should not be so limited. Actually, the embodiments of the present disclosure can be applied to the ITU-T or MPEG standardization groups as part of the development of a new generation encoder dedicated to the archiving and distribution of HDR video content.

Although the embodiments of the present disclosure have been described based on AVC or HEVC, the embodiments of the present disclosure should not be so limited, but can be applied to other video encoding schemes.

It should be appreciated that the above embodiments are only for illustrating the principle of the present disclosure, and in no way limit the scope of the present disclosure.

The invention claimed is:

1. A method for encoding an image block, comprising:
    determining a local dynamic range of the block identified by a maximum pixel value and a minimum pixel value among the pixel values of the block;
    adaptively precision-extending pixel values of the block based on the local dynamic range of the block; and
    encoding the block with an adaptively extended precision;
    wherein said adaptively precision-extending pixel values of the block based on the determined local dynamic range of the block comprises:
        calculating a precision extension factor (f) defined as $2^{(N-N_{local})}$—while keeping an original bit depth of the pixel values of the block, wherein N is the original bit depth and $N^{local}$ is a reduced bit depth used for indicating a difference between the maximum pixel value and the minimum pixel value; and
        for each of the pixels in the block, calculating a new pixel value by subtracting the minimal pixel value from the pixel value of the pixel, and multiplying the new pixel value by the precision extension factor.

2. The method of claim 1, wherein said encoding the block with an adaptively extended precision comprises:
    for other blocks from which the block is predicted, adaptively precision-extending pixel values of said other blocks based on the determined local dynamic range of the block; and
    predicting the block by using said other blocks after being adaptively precision-extended.

3. The method of claim 2, wherein said encoding the block with an adaptively extended precision further comprises:
    calculating residual values between the block and the predicted block;
    calculating coefficients of the block by performing DCT transform on the residual values; and
    quantizing the coefficients of the block according to a quantization step which is calculated based on the precision extension factor.

4. The method of claim 1, further comprising:
    encoding the minimum pixel value and an indicating value for indicating the precision extension factor as precision extension information,
    wherein the indicating value comprises at least one of the difference between the maximum pixel value and the minimum pixel value, a reduced bit depth used for indicating the difference, and a difference between the original bit depth and the reduced bit depth.

5. A method for decoding an image block, comprising:
    determining a minimum pixel value of the block and an indicating value for indicating a precision extension factor according to precision extension information, wherein the precision extension factor defined as $2^{(N-N_{local})}$, wherein N is the original bit depth and $N_{local}$ is a reduced bit depth used for indicating a difference between the maximum pixel value and the minimum pixel value;
    decoding the block with an adaptively extended precision according to the indicating value; and
    de-extending the precision of the decoded block based on the minimum pixel value of the block and the precision extension factor.

6. The method of claim 5, wherein said decoding the block with an adaptively extended precision according to the indicating value comprises:
    inverse-quantizing encoded data of the block according to a quantization step which is calculated based on the indicating value;
    calculating residual values by performing an inverse-DCT transform on the inverse-quantized encoded data of the block.

7. The method of claim 6, wherein said decoding the block with an adaptively extended precision according to the indicating value further comprises:
    for other decoded blocks from which the block is predicted, adaptively precision-extending pixel values of said other decoded blocks based on the minimum pixel value of the block and the precision extension factor while keeping the original bit depth of the block;
    predicting the block by using the other decoded blocks being precision-extended; and
    reconstructing the block by adding the predicted block and the residual values to obtain the decoded block.

8. The method of claim 5, wherein said de-extending the precision of the decoded block based on the minimum pixel value of the block and the precision extension factor comprises:
    dividing each of pixel values of the decoded block by the precision extension factor, and then adding the minimum pixel value thereto.

9. An encoder comprising:
    a local dynamic determination module used to determine a local dynamic range of the block identified by a maximum pixel value and a minimum pixel value among the pixel values of the block;
    an adaptive precision extension module used to adaptively precision-extend pixel values of the block based on the local dynamic range of the block; and
    an encoding module used to encode the block with an adaptively extended precision,
    wherein the adaptive precision extension module is further used to
        calculate a precision extension factor defined as $2^{(N-N_{local})}$ while keeping an original bit depth of the pixel values of the block, wherein N is the original bit depth and $N_{local}$ is a reduced bit depth used for indicating a difference between the maximum pixel value and the minimum pixel value; and
        for each of the pixels in the block, calculate a new pixel value by subtracting the minimal pixel value from the pixel value of the pixel, and multiply the new pixel value by the precision extension factor.

10. A decoder comprising:
    a block information determination module used to determine a minimum pixel value of the block and an indicating value for indicating a precision extension factor according to received precision extension information, wherein the precision extension factor is defined as $2^{(N-N_{local})}$, wherein N is the original bit depth and $N_{local}$ is a reduced bit depth used for indicating a difference between the maximum pixel value and the minimum pixel value;
    a decoding module used to decode the block with an adaptively extended precision according to the indicating value; and
    an adaptive precision restoring module used to de-extend the precision of the decoded block based on the minimum pixel value of the block and the precision extension factor.

11. Non-transitory computer-readable medium comprising a computer program product recorded thereon and capable of being run by a processor, including program code instructions for implementing the steps of a method according to claim 1.

12. The encoder of claim 9, wherein the adaptive precision extension module, for other blocks from which the block is predicted, adaptively precision-extends pixel values of said other blocks based on the determined local dynamic range of the block; and the encoding module further predicts the block by using said other blocks after being adaptively precision-extended.

13. the encoder of the claim 12, wherein the encoding module further calculates residual values between the block and the predicted block;

calculates coefficients of the block by performing DCT transform on the residual values; and quantizes the coefficients of the block according to a quantization step which is calculated based on the precision extension factor.

14. The encoder of the claim 9, wherein the encoding module further encodes the minimum pixel value and an indicating value for indicating the precision extension factor as precision extension information, wherein the indicating value comprises at least one of the difference between the maximum pixel value and the minimum pixel value, a reduced bit depth used for indicating the difference, and a difference between the original bit depth and the reduced bit depth.

15. The decoder of claim 10, wherein the decoding module further inverse-quantizes encoded data of the block according to a quantization step which is calculated based on the indicating value; and calculates residual values by performing an inverse-DCT transform on the inverse-quantized encoded data of the block.

16. The decoder of claim 15, wherein the adaptive precision restoring module, for other decoded blocks from which the block is predicted, adaptively precision-extends pixel values of said other decoded blocks based on the minimum pixel value of the block and the precision extension factor while keeping the original bit depth of the block; and the decoding module further predicts the block by using the other decoded blocks being precision-extended; and reconstruct the block by adding the predicted block and the residual values to obtain the decoded block.

17. The decoder of claim 10, wherein the adaptive precision restoring module divides each of pixel values of the decoded block by the precision extension factor, and then adds the minimum pixel value thereto.

* * * * *